United States Patent

[11] 3,615,994

| [72] | Inventors | Ian A. MacLaine<br>Lachine, Quebec;<br>Peter G. Montgomery, Montreal, Quebec,<br>both of Canada |
|---|---|---|
| [21] | Appl. No. | 832,797 |
| [22] | Filed | June 12, 1969 |
| [45] | Patented | Oct. 26, 1971 |
| [73] | Assignee | Domco Industries Limited<br>Montreal, Quebec, Canada |

[54] METHOD OF JOINING THE EDGES OF CUSHIONED VINYL SHEET MATERIAL
17 Claims, 9 Drawing Figs.

[52] U.S. Cl.................................................. 156/159,
156/244, 156/304, 156/305, 161/38, 161/160
[51] Int. Cl.................................................. B31f 5/06
[50] Field of Search................................. 156/157,
159, 258, 304, 305, 500, 502, 244, 158; 161/36,
38, 247, 160, 39, 161, 252

[56] References Cited
UNITED STATES PATENTS

| 3,501,370 | 3/1970 | Juredine | 161/160 |
|---|---|---|---|
| 3,272,688 | 9/1966 | Holstrom et al. | 161/161 |
| 2,605,204 | 7/1952 | Benedict et al. | 161/36 X |
| 3,008,862 | 11/1961 | Haine et al. | 156/244 |
| 3,464,178 | 9/1969 | Deichert et al. | 161/38 X |
| 3,219,508 | 11/1965 | Studer et al. | 161/36 X |
| 2,269,419 | 1/1942 | Adler et al. | 24/205.16 |
| 3,293,108 | 12/1966 | Nairn et al. | 161/160 |
| 1,217,253 | 2/1917 | Williamson | 156/159 |
| 3,166,458 | 1/1965 | Chinn et al. | 156/157 X |

*Primary Examiner*—Philip Dier
*Attorney*—Maybee & Legris

ABSTRACT: Composite sheet vinyl strips are joined together by applying an adhesive to the edges to be joined, and maintaining the edges in contact underpressure until the adhesive is cured. The adhesive, which may be an elastomeric urethane or an epoxy resin, is applied as a continuous bead, without solvent; its viscosity is between 5,000 and 80,000 centipoises at 73° F. In a particular embodiment of the invention the vinyl wear layers of the strips are first bonded by solvent welding.

PATENTED OCT 26 1971
SHEET 1 OF 4
3,615,994
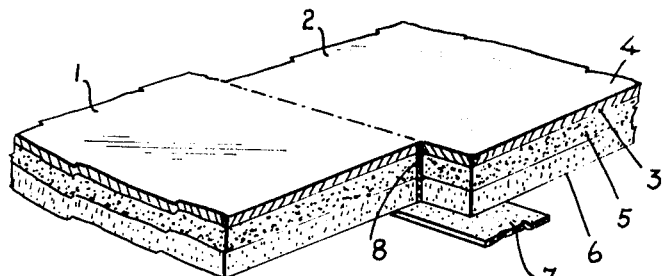
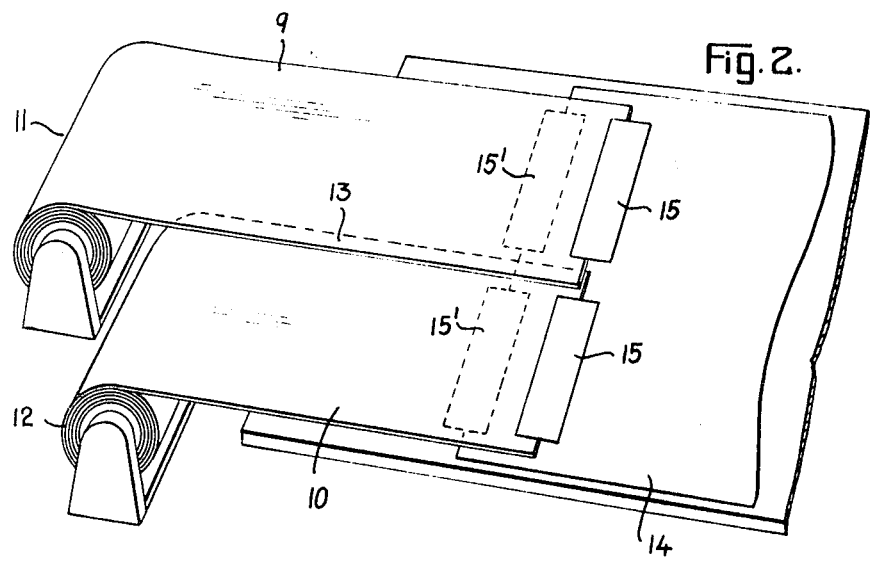
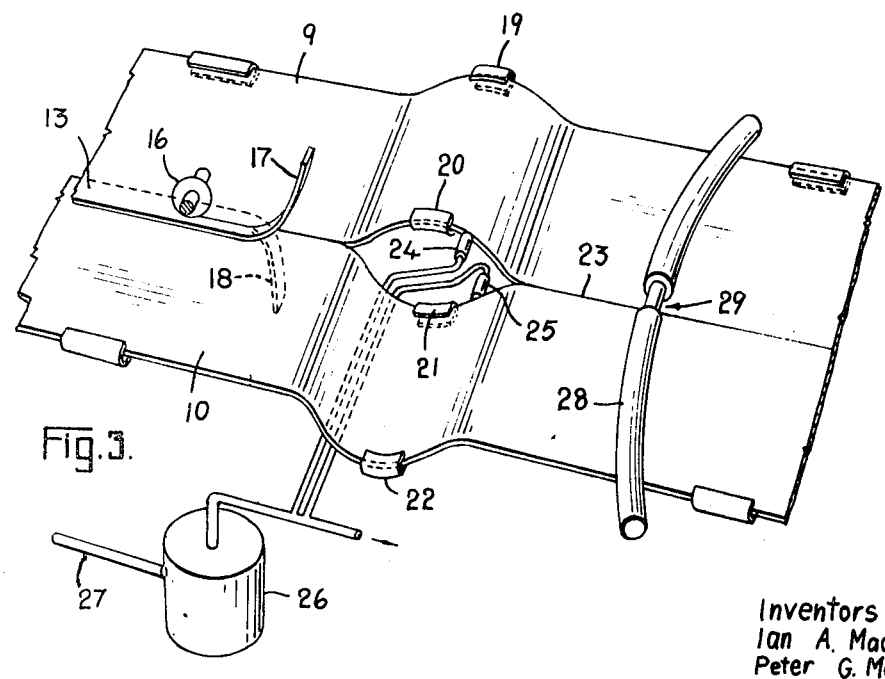
Inventors
Ian A. MacLaine
Peter G. Montgomery
By Maybee & Legris
Attorneys Inventors
Ian A. MacLaine
Peter G. Montgomery
BY *Maybee & Legris*
Attorneys.

Inventors
Ian A. MacLaine
Peter G. Montgomery
By Maybee & Legris
Attorneys

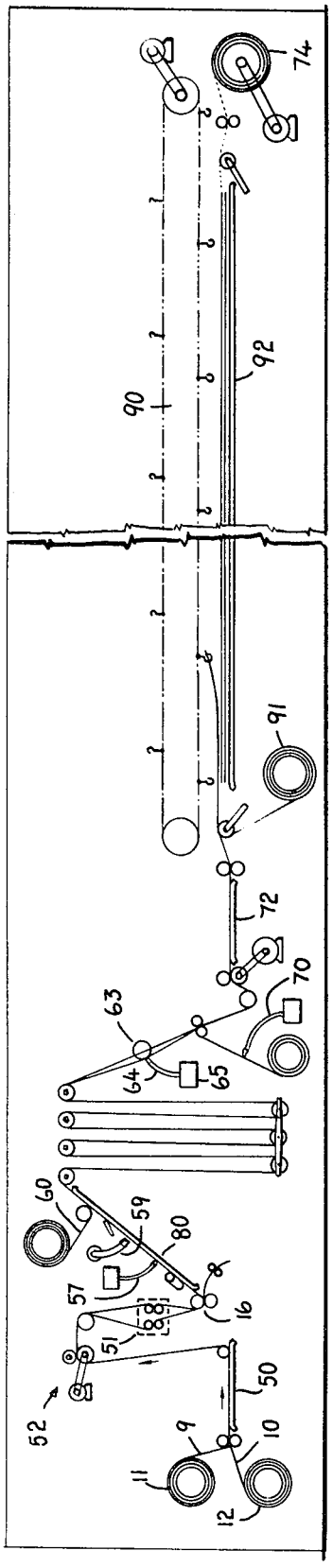

METHOD OF JOINING THE EDGES OF CUSHIONED VINYL SHEET MATERIAL

BACKGROUND OF THE INVENTION

This invention relates to vinyl sheet structures, especially for floor coverings, and to the joining of cushioned vinyl strips for producing such structures. The term "vinyl" is used herein to denote polyvinyl chloride and equivalent polymers of the vinyl class. A cushioned vinyl sheet for floor covering is normally a laminated structure consisting of a vinyl wear layer, providing a tread surface, an intermediate layer of foamed vinyl providing a cushion, and a resin-impregnated fibrous backing layer. The sheet is normally produced in continuous lengths or strips of a standard width, which are installed and joined by seam sealing.

It is the primary object of this invention to provide a method of effectively joining widths of the cushioned vinyl sheet to form a sheet structure whose appearance is at least as good as that of a conventionally seam-sealed floor covering, and whose strength approaches the ultimate product strength.

Three alternative methods of attaining this object have been considered. These were rejected, however, because of high product costs, and the risk of damage to the product during processing as well as distortion of the product.

SUMMARY OF THE INVENTION

The present invention is based upon the discovery that a highly satisfactory product can be produced by butt joining the edges of the cushioned vinyl strips using an adhesive. It is most important, however, that the adhesive be carefully selected with due regard to its properties in the liquid state and in the cured state, since the method must ensure a satisfactory deposition of the adhesive, compatibility with the composite material, and high strength and flexibility of the product.

A method according to the invention for joining the edges of cushioned vinyl sheet material comprises applying a nonvolatile synthetic polymeric adhesive, without solvent as a continuous bead to the edges to be joined, placing the edges in contact, maintaining the edges in contact underpressure for a time sufficient to bond the edges together, and subsequently curing the adhesive. The adhesive is applied as a liquid having a viscosity in the range 5,000 to 80,000 centipoises, and in the cured state the adhesive has a tensile strength in the range 1,500 to 15,000 pounds per square inch, an elasticity of at least 70 percent, and a vinyl-vinyl peel strength of at least 3 - pounds per inch. The adhesive may be an elastomeric urethane polymer or an epoxy resin.

It is desirable that a reinforcing tape be applied to the backing layer along the seam, and in this case the adhesive when cured should have a flexural modulus of between 5,000 and 10,000 -pounds per square inch. Where a reinforcing tape is omitted, an adhesive possessing a flexural modulus between 70,000 and 300,000 pounds per square inch yields the best results.

BRIEF DESCRIPTION OF THE DRAWINGS

In the accompanying drawings:

FIG. 1 is a fragmentary perspective view of a vinyl sheet structure according to the invention, formed by butt joining two cushioned vinyl strips;

FIGS. 2 to 5 diagrammatically illustrate successive steps in a first method for butt joining cushioned vinyl strips; and FIGS. 6 to 9 diagrammatically illustrate respective forms of apparatus for performing modified methods for butt joining the strips.

DESCRIPTION OF THE PREFERRED EMBODIMENTS

THE COMPOSITE END PRODUCT

Figure 4:
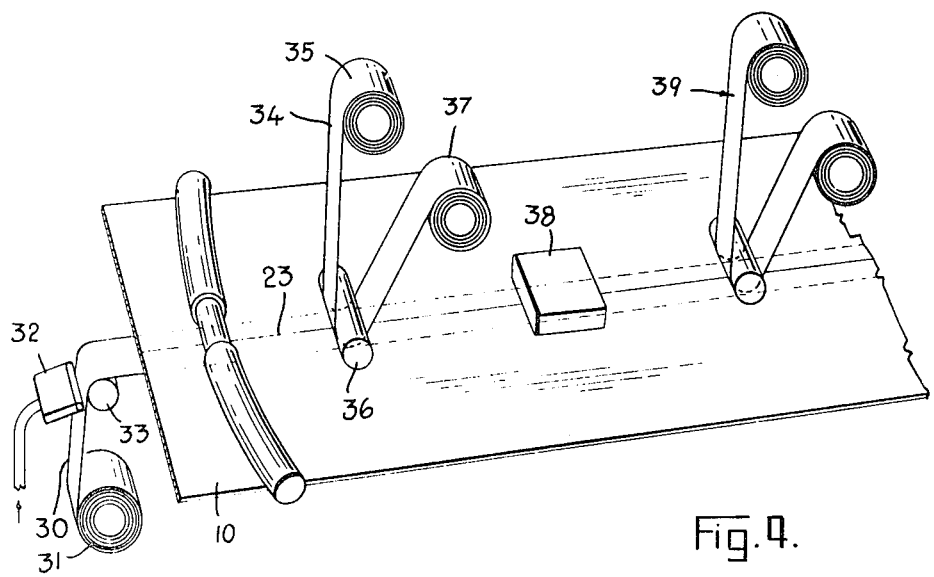

FIG. 1 illustrates a vinyl sheet structure consisting of a pair of composite laminated strips 1, 2 which are butt joined together along respective longitudinal edges. Each strip comprises a vinyl wear layer 3, providing a front face 4, an intermediate foamed vinyl layer 5 forming a cushion, and a resin-impregnated backing layer 6 providing a backface. A reinforcing tape 7 adhering to the backfaces of the strips 1, 2 extends continuously along the join. Preferably the vinyl wear layers 3 are solvent welded along their registering edges, the layers 5 and 6 being adhered together by adhesive 8.

Methods of joining the laminated strips to produce the end product will now be described in the following examples. All the methods are essentially similar, but differ according to whether the wear layers of the strips are to be joined by solvent welding, whether a reinforcing tape is to be applied to the seam, and whether a continuous or intermittent process is envisaged. The forms of apparatus shown in FIGS. 6–9 differ according to the final curing step.

The essential features of the basic method are described in detail in example 1, but in examples 2–5 the descriptions are limited to the particular variations or refinements of the method.

EXAMPLE 1

The first method of joining the strips will be described under the following headings:

1. Sheet registration and trimming.
2. Adhesive preparation and application.
3. Edge contact, compression and reinforcement.
4. Surface cleaning and protection.
5. Termination and adhesive cure.

1. SHEET REGISTRATION AND TRIMMING

The strips to be butt joined must be carefully judged for suitability of design and shade match, and must be chosen from sequentially numbered rolls or from large rolls in process.

The strips 9, 10 illustrated in FIG. 2 are 6-feet wide and are let off from the selected rolls 11, 12, which are positioned in such a way that the edges to be joined overlap by about an inch, as indicated at 13. When precise longitudinal registration of the strips (with respect to design or surface pattern) has been established, their leading edges are spliced to a 12-foot wide paper leader 14 on both front and backfaces of the strips, by means of pressure sensitive tape 15, 15'.

A vertical rotary slitter 16 (FIG. 3) is now engaged with the leading edge of the strip assembly, at the overlap 13, and the assembly is advanced at a constant speed so that two new longitudinal edges are formed in exact registration. The upper sheared strip 17 and lower sheared strip 18 are diverted to waste receivers (not shown). As the newly trimmed strips 9, 10 are advanced, they are separated vertically and led through edge guide members 19, 20, 21, 22, the strips being guided back into the original common plane with the trimmed edges abutting as shown at 23. While the strips 9, 10 are separated, adhesive is applied to the longitudinal edges by means of adhesive applicators 24, 25, to which the adhesive is supplied underpressure from a pressure tank 26.

The speed of slitting should be compatible with the rate of strip advance, which is preferably in the range 10 feet/minute to 20 feet/minute.

2. ADHESIVE SELECTION AND APPLICATION

The success of the method according to the present invention is largely dependent upon the adhesive type, the quantity deposited, and the viscosity and surface tension of the adhesive, all of which affect the satisfactory deposition and disposition of adhesive within the seam opening and adjacent structure. Adhesives containing solvents are unsuitable for this method because solvents are difficult to remove and have a tendency, depending upon the type, to adversely affect the vinyl foam and wear layer structure and properties. The nature of the composite materials and solubilities of applicable polymers tend to mitigate against obtaining an adequate deposit of solids, properly distributed within the vinyl structure with adequate subsequent solvent dissipation and strength development. According to the present invention, a nonvolatile synthetic polymeric adhesive, without solvent, is applied as a continuous bead to the edges to be joined, the adhesive being applied as a liquid having a viscosity in the range 5,000 to 80,000 centipoises.

The most important characteristics upon which satisfactory performance of the adhesive depends, are the tensile and elongation properties imparted to the seam. In order that a satisfactory bond may be obtained, the tensile strength of the adhesive interface must be at least as great as the product itself. If the bonded product is subjected to a tensile stress to failure the rupture should occur within the product itself prior to any separation at the bonded seam. It has been determined that the substrate bond, exclusive of the intermediate layer and wear layer, must exceed 1,500 lbs./in.$^2$ for an otherwise nonreinforced joint. For a tape reinforced seam, an adhesive yielding a lower tensile strength can be used, but the finished taped seam must exceed the 55 lbs./in. of width minimum tensile strength.

For any adhesive system the tensile strength must be considered in relation to its elongation and elastic properties. During transportation and subsequent installation the product can be subjected to flexure, and so the seam must be capable of elongation and recovery without deformation or rupture of the seam. This is particularly true when the backing layer is subjected to high orders of tensile stress during folding or flexing. The product and consequently the seam must withstand bending around a 1½-inch diameter mandrel contacting 180° of circumference. If the adhesive produces a seam with too low or too high elongation subsequent flexing will produce a joint which can become creased or peaked, permanently deformed and weakened. This is very significant with regard to a tape reinforced seam system. It has been found that for the adhesive composition alone the elongation to point of tensile failure should be between 100 percent and 200 percent with the most suitable elongation to failure about 150 percent. In the case where the seam is not reinforced by tape, it is preferred that the adhesive in the cured state should have a flexural modulus in the range 70,000 to 300,000 lbs./in.$^2$.

Another important property is the recovery or elasticity of the stressed seam. If the recovery is of a low order then deformation and high stress concentrations will occur at the joint. It has been found that the recovery for a seam stressed to 75 percent of ultimate tensile strength for 5 minutes should be at least 70 percent, preferably 80 to 90 percent, after the load has been removed for 5 minutes. The percentage recovery increase of initial elongation must be over 70 percent to ensure against significant permanent deformation of the seam.

Another requisite property of the adhesive is that it should satisfactorily adhere plasticized polyvinyl chloride resin to itself, since part of it will be deposited within the foamed or expanded intermediate layer of the vinyl structure. The bonding requirements measured by a vinyl-vinyl 180° angle peel test was estimated at 3 lbs./in. minimum with preferred bonding strength in excess of 5 lbs./in. of width.

Chemical resistance to acid, alkali, and petroleum solvents is an important characteristic influencing the choice of adhesive type. In addition any adhesive system must possess good aging properties such that there is a minimum deterioration of the adhesive joint over an extended period of time.

Table 1 summarizes the properties of suitable adhesives, giving the limit values of the important parameters.

The types of adhesive which have found to be most useful in the joining of composite, cushioned vinyl widths are derived from the broad families of urethane and epoxy compositions.

TABLE 1

| Property[1] | Units | Values | |
|---|---|---|---|
| | | Minimum | Maximum |
| Gardner colour | Gardner | — | 12 |
| Viscosity | cps. | 5,000 | 80,000 |
| Tensile strength | Lbs/in$^2$ | 1,500 | 15,000 |
| Elongation to failure | % | *5 | *20 |
| | | 100 | 200 |
| Elasticify[2] | % | 70 | — |
| Flexural modulus | Lbs/in$^2$ | 5,000 | 10,000 |
| | | *70,000 | *300,000 |
| Vinyl-vinyl peel strength | Lbs/in | 3 | — |

[1] All properties measured at 73° F. 50% R.H.
[2] Samples stressed to 75% of ultimate tensile strength for 5 minutes. Load removed for 5 minutes and recovery measured in % of initial elongation.
* Values for adhesives suitable for seams without reinforcing tape.

An epoxy adhesive system and a urethane adhesive system found to be particularly advantageous in the method of the invention, are indicated below, the essential properties of the system being given in table 2.

Epoxy adhesive system:
 "Epon 828"[1]—3 parts/wt.
 "Versamid 140"[2]—1 part/wt.
Urethane adhesive system:
 "Desmorphen 1150"[3]—10 parts/wt.
 "Desmodur VL"[3]—4 parts/wt.

TABLE 2

| Components | Epoxy, Epon 828 | Hardener, Versamid 140 | Urethane, Desmophen 1150 | Hardener, Desmodur VL |
|---|---|---|---|---|
| Weight ratios—two components | 3 | 1 | 10 | 4 |
| Viscosity—mixed adhesive (cps.) | 70,000 | | 6,000–7,000 | |
| Tensile strength (p.s.i.) | 7,000 | | 2,000 | |
| Elongation to failure, (percent) | 5 | | 100 | |
| Elasticity,[4] percent | 85 | | 80 | |
| Flexural modulus (p.s.i.) | 235,000 | | 7,000 | |
| Vinyl to vinyl 180°, peel strength (lbs./in.) | 1.0 | | 5.0 | |
| Hardness (Shore B) | 95 | | 75 | |

[1] Trademark of Shell Chemical Company.
[2] Trademark of General Mills.
[3] Trademark of Bayer Dyestuffs & Chemicals Ltd.
[4] Samples elongation to 75% of their ultimate tensile strength. Force is removed and recovery measured after 5 minutes.

Referring again to FIG. 3, the tank 26 is a "Fox" type 410–001 1-gallon pressure tank assembly, which is held in an ice water mixture to subject the adhesive to uniform cool temperature. An air pressure regulator (not shown) connected to a pressure pipe 27 is adjusted to a setting at which about 2 grams per minute of the adhesive are delivered from each of the two applicators 24, 25, positioned to deposit a continuous bead of the adhesive against the trimmed edges of the strips 9, 10. The applicators 24, 25 are "Fox" type 404–200 cleat tips. The strips are advanced slowly to a point where microswitches are tripped to actuate the solenoid control valves and the adhesive is applied at a rate of from 0.15 to 0.2 grams per foot from each applicator. The solenoid adhesive control valves must be interlocked with the drive for the strips so that the adhesive supply is cutoff if the drive is stopped.

3. EDGE CONTACT COMPRESSION AND REINFORCEMENT

After the application of the adhesives to the trimmed edges of the strips 9 and 10, the strips are returned to the same plane and the edges to be joined are brought into contact with one another as indicated at 23. A compression roller 28, the roll covering of which is removed from the central region adjacent the seam as indicated at 29, is used to hold the edges together in a manner which will force adhesive into the edge structure and minimize displacement of adhesive to the surfaces of the strips.

A half-inch wide tape 30 is fed from a roll 31 to the backface of the seam 23. The tape may be made from woven fiber glass, spun bonded polyolefin fibrils, woven polyester fibers or other high-tenacity, low-elongation materials which are 0.005 inches or less in thickness. A preferred reinforcing tape is half-inch wide, 0.003 inch thick, fiber glass woven edge tape of 42 picks, 30 ends of 450 denier thread. Adhesive is applied to one face of the tape by means of a type 403-102-3 "Fox" roller tip applicator 32, to which the adhesive is supplied from the pressure tank 26 (FIG. 3). A roller 33 around which the tape passes is positioned so that the adhesive coated tape is brought into contact with the backface of the strips.

4. SURFACE CLEANING AND PROTECTION

The seam 23 is wiped continuously to remove any adhesive from the front face of the joined strips. This is achieved by means of a 1-inch wide paper towel wiper tape 34 which is continuously dispensed from a roll 35, pressed against the seam 23 with a soft roller 36, and rewound on a roll 37. To ensure complete removal of any excess adhesive, a solvent pad 38, containing isopropanol, and a secondary tape wiper 39 are provided.

Figure 5:
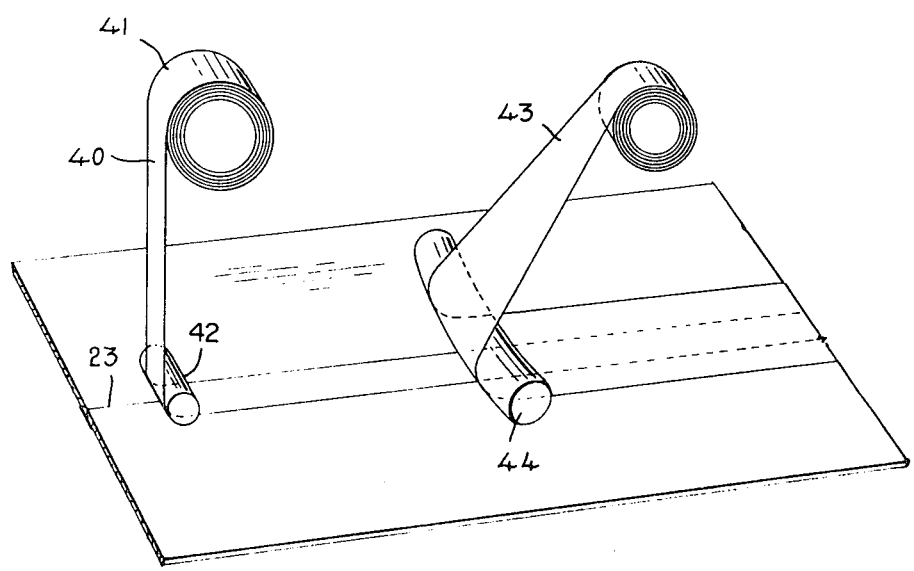

Finally, referring to FIG. 5, a half-inch wide tape of release paper 40 is dispensed from a roll 41 and applied to the seam by means of a soft roller 42. The release paper 40 is secured in place by means of an expanded elastic, pressure sensitive bandage tape 43, which, by means of an expander roll 44, is widened and pressed into firm contact with the face of the sheet structure.

5. TERMINATION AND ADHESIVE CURE

As the butt joining of each pair of strips is completed, the sheet structure is drawn forward into a rack having a plurality of openings, where it is cured at room temperature for the required period of time prior to inspection and rerolling. The tapes 30, 40 and 43 are severed and a new paper leader is attached to the succeeding strips to be joined in the same manner. The release paper 40 and elastic bandage 43 are stripped from the front face of the structure after curing.

EXAMPLE 2

Figure 6:
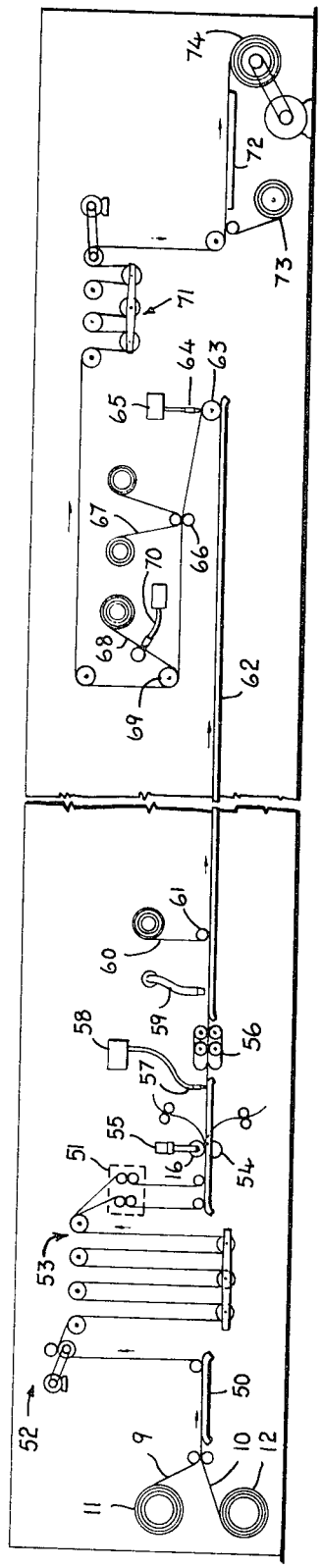

FIG. 6 illustrates a form of apparatus continuously butt joining successive pairs of cushioned vinyl strips. The method is substantially similar to the first method previously described, and steps that are the same as the steps of the previous method will not be described in detail. The essential difference between the first and second methods lies in the fact that, prior to the application of adhesive to the edges of the strips, the wear layers are joined by a solvent welding technique.

Referring to FIG. 6, the strips 9, 10 are advanced from rolls 11, 12 in overlapping edge relation to a splicing table 50. The leading ends of the strips are spliced to the trailing ends of the strips already being processed. The strips are advanced to an optical scanner 51 by a drive assembly 52, the scanner ensuring that the strips are fed to the rotary slitter 16 in perfect register. Any slack prior to the scanner is accommodated by means of a floating festooner 53. The slitter 16 is a rotating knife, of the shearing blade type or score cutter type, which operates under adjustable pressure against a backing roll 54. The backing roll, of course, has a step in it to accommodate the overlap between the strips. The pressure on the slitter during the slitting operation is controlled by air cylinders 55, which also serve to raise the slitter from the backing roll during the initial threading of the strips. As in the preceding example, the trimmed edges 17, 18 are led to waste.

The trimmed longitudinal edges of the strips 9, 10 are in exact abutting relation to form a seam and are maintained in close abutting relation underpressure by means of crowding conveyors 56; the latter consist of pairs of converging belt conveyors above and below the strips. A solvent for vinyl, preferably tetrahydrofuran, is applied as a film along the seam by means of a "Fox" applicator type 403-102-3, 57 to which the solvent is fed at a controlled rate from a tank 58. Excess solvent is evaporated from the surface of the wear layer by a light stream of warm air from a nozzle 59 located from 3 to 10 feet behind the applicator 57. It is important to remove excess solvent, for this would cause dulling of the wear layer surface if allowed to remain too long.

To give added strength to the welded seam during processing, a pressure sensitive tape 60 is applied along the seam by means of a roller 61 acting under controlled pressure.

A satisfactory weld of the wear layers is effected within about 5 minutes after the solvent is applied, and so it is arranged that the strips be advanced at about 10 feet/minute along a flat metal table 62 before the subsequent adhesive application is commenced. At one end of the table 62 the strips 9, 10 are fed round a pair of profiled rollers 63 which are tapered at both ends so as to open up the back of the seam. This provides a gap into which adhesive can be deposited as a continuous bead. A seam gap angle of 30° has been found necessary to allow sufficient space for the adhesive. The adhesive, which is a suitable synthetic polymeric adhesive as in the previous example, is applied into the seam gap by means of a "Fox" applicator 64 supplied from a metering device 65. The strips are brought back to a flat condition by roller 66, and excess adhesive squeezed out of the gap is wiped off by a paper towel 67.

A reinforcing tape 68 is applied to the back of the seam by a roller 69, one face of the tape having been coated with adhesive by means of an adhesive applicator 70. A release paper, not shown, may also be applied over the reinforcing tape. Finally, the joined strips are fed over a floating festooner 71 to a splicing table 72, the release paper if any being rewound on a roll 73, and the product is wound on a roll 74 for final curing.

EXAMPLE 3

Figure 7:
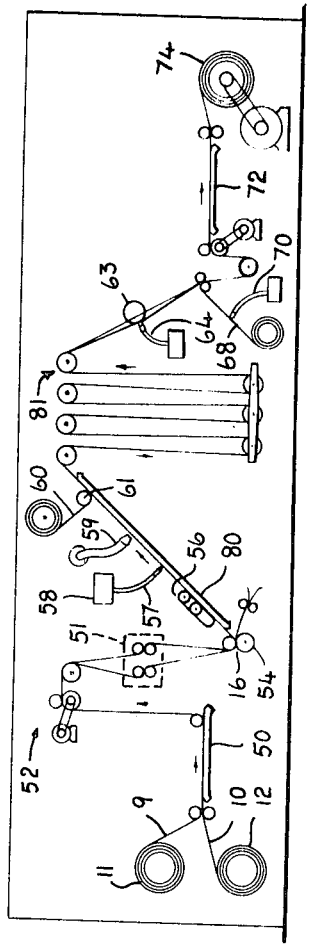

FIG. 7 illustrates a form of apparatus designed for intermittent processing of the vinyl strips. The method is essentially similar to the method described in the preceding example, the strips 9, 10 being advanced from rolls 11, 12 in overlapping relation to a splicing table 50, and registration being effected by means of an optical scanner 51. Since this apparatus is designed for intermittent processing, the floating festooners 53 and 71 of FIG. 6 are omitted. The overlapping strips are slit longitudinally by a rotary slitter 16, and the strips are advanced in edge abutting relationship along a sloping table 80 and past a crowding conveyor 56, solvent applicator 57 and an air drier nozzle 59. A temporary reinforcing tape 60 is applied to the welded seam by a pressure roller 61. The table 62 of FIG. 1 is replaced in this case by a fixed type festooner 81, over which the strips are passed at a rate which allows curing of the solvent weld before the strips reach profiled rollers 63 for opening the back of the seam. A continuous bead of the synthetic polymeric adhesive is applied to the seam gap by means of an applicator 64, a reinforcing tape 68 being applied to the back of the seam after removal of excess adhesive. Finally the joined strips are advanced across a splicing table 72 to be wound on roll 74.

EXAMPLE 4

FIG. 8 shows a form of apparatus which is essentially the same as the apparatus of FIG. 7, and the same reference numerals are used to denote corresponding parts. In this case the leading end of each successive length is engaged by a chain conveyor 90, after application of release paper 91 to the back of the seam, and the product is drawn onto a flat table 92 where it is cured in the flat condition.

EXAMPLE 5

FIG. 9 illustrates yet another form of apparatus which is essentially similar to the apparatus of FIG. 8, and the same reference numerals are used to denote corresponding parts. In this case the welded seam at the wear layer is cured as the product is advanced slowly over a flat table 100, the table in effect replacing the fixed type festooner 81 of FIG. 7.

What we claim as our invention is:

1. A method of joining the edges of cushioned vinyl composite sheet material having a foamed vinyl intermediate layer, which method comprises applying a nonvolatile synthetic polymeric adhesive as a continuous bead to the edges to be joined, placing the edges in contact, maintaining the edges in contact underpressure for a time sufficient to bond the edges together, and subsequently curing the adhesive, the adhesive being applied as a liquid having a viscosity in the range 5,000 to 80,000 centipoises, and in the cured state having a tensile strength in the range 1,500 to 15,000 pounds per square inch, an elasticity of at least 70% and a vinyl-vinyl peel strength of at least 3 pounds per inch.

2. The method claimed in claim 1, wherein the cured adhesive has a vinyl-vinyl peel strength of about 5 per inch.

3. The method claimed in claim 1, wherein the cured adhesive has a flexural modulus in the range 70,000 to 300,000 pounds per square inch, and an elongation to failure between 5 percent and 20 percent.

4. The method claimed in claim 1, wherein the composite sheet material comprises a vinyl wear layer, a foamed vinyl intermediate layer, and a backing layer, and in which a reinforcing tape is applied to the backing layer along the edges to be joined.

5. The method claimed in claim 4, in which the reinforcing tape is of fabric woven from spun glass and impregnated with an adhesive selected from the group consisting of elastomeric urethane systems and epoxy resin systems.

6. The method claimed in claim 4, wherein the cured adhesive has a flexural modulus in the range 5,000 to 10,000 pounds per square inch and an elongation to failure between 100 percent and 200 percent.

7. The method claimed in claim 1, wherein the adhesive is selected from the group consisting of elastomeric urethane systems and epoxy resin systems.

8. The method claimed in claim 1, the composite sheet material consisting of a vinyl wear layer, a foamed vinyl intermediate layer, and a backing layer, wherein prior to the application of the adhesive to the edges to be joined, the edges are butted together to form a seam and the abutting edges of the vinyl wear layers are solvent welded by applying a vinyl solvent to the seam, excess solvent being removed.

9. The method claimed in claim 8, wherein the vinyl solvent is tetrahydrofuran.

10. A method of joining strips of cushioned vinyl composite sheet material, consisting of a vinyl wear layer, foamed vinyl intermediate layer, and a backing layer, which method comprises:
   a. simultaneously feeding the strips in a longitudinal direction, adjacent longitudinal edges of the strips overlapping one another;
   b. slitting the strips longitudinally at the overlap to provide two new longitudinal edges;
   c. guiding the strips to separate the new edges;
   d. applying a nonvolatile synthetic polymeric adhesive as a continuous bead to said new edges while separated;
   e. guiding the strips to bring said new edges back into regisrAtion to form a seam;
   f. maintaining said new edges in contact underpressure for a time sufficient to bond the edges together, while applying an adhesive-coated reinforcing tape to the backing layer along the seam;
   g. removing excess adhesive from the surface of the wear layer;
   h. and curing the adhesive while the contact pressure is maintained,
   i. the adhesive being applied as a liquid having a viscosity in the range 5,000 to 80,000 centipoises, and in the cured state having a tensile strength in the range 1,500 to 15,000 pounds per square inch, an elasticity of at least 70 percent, a vinyl-vinyl peel strength of at least 3 pounds per inch, a flexural modulus in the range 5,000 to 10,000 and elongation to failure between 100 percent and 200 percent.

11. The method claimed in claim 10, wherein the adhesive is selected from the group consisting of elastomeric urethane systems and epoxy resin systems.

12. A method of joining strips of cushioned vinyl composite sheet material consisting of a vinyl wear layer providing a front face, foamed vinyl intermediate layer, and a backing layer providing a backface, which method comprises:
   a. simultaneously feeding the strips in a longitudinal direction, adjacent longitudinal edges of the strips overlapping one another;
   b. slitting the strips longitudinally at the overlap to provide two new longitudinal edges;
   c. placing the new edges in registration to form a seam;
   d. solvent welding the registering edges of the wear layers by applying a vinyl solvent to said front face along the seam;
   e. removing excess vinyl solvent from the front face;
   f. opening the seam at the backface to expose adjacent edges of said intermediate and backing layers;
   g. applying a nonvolatile synthetic polymeric adhesive as a continuous bead to said exposed edges;
   h. closing the seam to bring the adhesive-coated edges into contact underpressure;
   i. applying an adhesive-coated reinforcing tape to the backing layer along the seam;
   j. and curing the adhesive while the contact pressure is maintained,
   k. the adhesive being applied as a liquid having a viscosity in the range 5,000 to 80,000 centipoises, and in the cured state having a tensile strength in the range 1,500 to 15,000 pounds per square inch, an elasticity of at least 70 percent, a vinyl-vinyl peel strength of at least 3 pounds per inch, a flexural modulus in the range 5,000 to 10,000 and elongation to failure between 100 percent and 200 percent.

13. The method claimed in claim 12, wherein the vinyl solvent is tetrahydrofuran.

14. The method claimed in claim 12, wherein the synthetic polymeric adhesive is selected from the group consisting of elastomeric urethane systems and epoxy resin systems.

15. A method of joining strips of cushioned vinyl composite sheet material consisting of a vinyl wear layer providing a front face, foamed vinyl intermediate layer, and a backing layer providing a backface, which method comprises:
   a. simultaneously feeding the strips in a longitudinal direction, adjacent longitudinal edges of the strips overlapping one another;
   b. slitting the strips longitudinally at the overlap to provide two new longitudinal edges;
   c. placing the new edges in registration to form a seam;
   d. solvent welding the registering edges of the wear layers by applying a vinyl solvent to said front face along the seam;
   e. removing excess vinyl solvent from the front face;
   f. opening the seam at the backface to expose adjacent edges of said intermediate and backing layers;
   g. applying a nonvolatile synthetic polymeric adhesive as a continuous bead to said exposed edges;
   h. closing the seam to bring the adhesive-coated edges into contact underpressure;
   i. and curing the adhesive while the contact pressure is maintained,
   the adhesive being applied as a liquid having a viscosity in the range 5,000 to 80,000 centipoises, and in the cured state having a tensile strength in the range 1,500 to 15,000 pounds per square inch, an elasticity of at least 70 percent, a vinyl-vinyl peel strength of at least 3 pounds per inch, a flexural modulus in the range 70,000 to 300,000 pounds per square inch, and an elongation to failure between 5 percent and 20 percent.

16. The method claimed in claim 15, wherein the vinyl solvent is tetrahydrofuran.

17. The method claimed in claim 15, wherein the synthetic polymeric adhesive is selected from the group consisting of elastomeric urethane systems and epoxy resin systems.

* * * * *